(12) United States Patent
Rettmar et al.

(10) Patent No.: US 7,921,977 B2
(45) Date of Patent: Apr. 12, 2011

(54) LOCK DEVICE, TRANSMISSION/DRIVE UNIT CONTAINING SUCH A LOCK DEVICE, AND METHOD FOR MANUFACTURING SUCH A TRANSMISSION/DRIVE UNIT

(75) Inventors: Ulrich Rettmar, Buehlertal (DE); Ewald Becker, Buehl (DE); Peter Klobes, Bietigheim (DE); Uwe Velte, Ottersweier (DE)

(73) Assignee: Robert Bosch GmbH, Stuttgart (DE)

( * ) Notice: Subject to any disclaimer, the term of this patent is extended or adjusted under 35 U.S.C. 154(b) by 504 days.

(21) Appl. No.: 12/066,305

(22) PCT Filed: Nov. 15, 2006

(86) PCT No.: PCT/EP2006/068489
§ 371 (c)(1),
(2), (4) Date: Mar. 10, 2008

(87) PCT Pub. No.: WO2007/062982
PCT Pub. Date: Jun. 7, 2007

(65) Prior Publication Data
US 2008/0251346 A1    Oct. 16, 2008

(30) Foreign Application Priority Data

Nov. 29, 2005   (DE) .................. 10 2005 057 239
Apr. 18, 2006   (DE) .................. 10 2006 018 096

(51) Int. Cl.
*H02K 7/10*    (2006.01)
*F16D 65/21*   (2006.01)

(52) U.S. Cl. .................. 192/226; 192/84.92; 188/161

(58) Field of Classification Search .................. 192/226, 192/84.92; 188/161
See application file for complete search history.

(56) References Cited

U.S. PATENT DOCUMENTS

| 4,445,596 | A | | 5/1984 | Waters et al. |
| 5,121,018 | A | * | 6/1992 | Oldakowski .................. 310/77 |
| 6,237,730 | B1 | * | 5/2001 | Dropmann et al. .......... 188/171 |
| 6,909,213 | B2 | | 6/2005 | Frey et al. |

FOREIGN PATENT DOCUMENTS

| DE | 1 940 587 | 2/1971 |
| DE | 197 19 990 | 11/1998 |
| EP | 1 011 188 | 6/2000 |
| EP | 1 320 175 | 6/2003 |
| FR | 2 588 702 | 4/1987 |
| JP | 61-233232 | 10/1986 |
| JP | 04098858 | 3/1992 |

* cited by examiner

*Primary Examiner* — Richard M. Lorence
(74) *Attorney, Agent, or Firm* — Michael J. Striker

(57) ABSTRACT

Blocking apparatus, as well as a gearbox drive unit containing such a blocking apparatus, as well as a method for production of a gearbox drive unit such as this for blocking any rotary movement of a shaft (14) with respect to a housing (16) of a gearbox drive unit (10), having a first blocking element (32) and having a second blocking element (34) which can be moved axially with respect to the first blocking element (32) by means of an electromagnet (44) and at least one return element (42), in order to produce a connection between the first blocking element (32) and the second blocking element (34) such that they cannot rotate with respect to one another, with the electromagnet (44) having an inner pole (47) which is surrounded by an electrical coil (45), and with the inner pole (47) having an axial projection (51) which engages in a corresponding opening (64) in the second blocking element (34), for axial guidance and centering.

18 Claims, 3 Drawing Sheets

Figure 1:
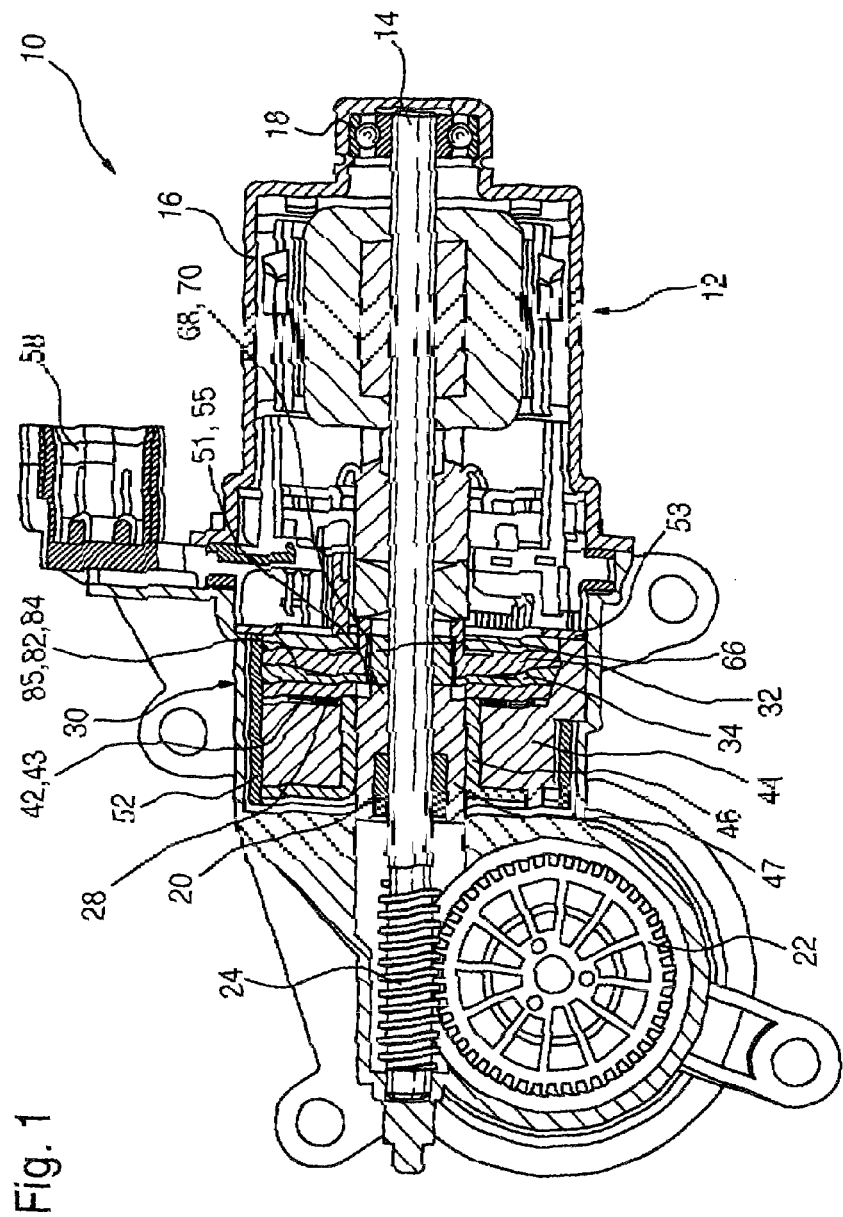

LOCK DEVICE, TRANSMISSION/DRIVE UNIT CONTAINING SUCH A LOCK DEVICE, AND METHOD FOR MANUFACTURING SUCH A TRANSMISSION/DRIVE UNIT

CROSS-REFERENCE TO RELATED APPLICATION

The invention described and claimed hereinbelow is a National Stage Application of PCT/EP2006/068489, filed Nov. 15, 2006, under 35 USC §371, which PCT application is also described in and claims priority from German Patent Application DE 10 2005 057 239.1, filed on Nov. 29, 2005, and German Patent Application DE 10 2006 018 096.8, filed Apr. 18, 2006. The German Patent Applications, whose subject matter is incorporated herein by reference, provide the basis for a claim of priority of invention under 35 U.S.C. 119(a)-(d).

PRIOR ART

The invention relates to a locking device with two locking elements situated in movable fashion in relation to each other, a transmission/drive unit containing such a locking device, and a method for manufacturing such a transmission/drive unit according to the preambles to the independent claims.

EP 1 320 175 A2 has disclosed a drive- and/or braking device in which a brake unit is situated inside a housing that encloses an electric motor. The brake unit has a brake disc and a brake element that can be electromagnetically pressed against each other in a frictionally engaging fashion. The brake element here is rotationally fixed and is axially affixed to the housing of the electric motor while the brake disc is situated in an axially movable fashion on the armature shaft of the electric motor, which is supported in a rotatable fashion.

A braking device embodied in this way has the disadvantage that a large number of tolerances must be compensated for during assembly of the drive unit because during the assembly, the brake element is preinstalled directly on the housing and the brake disc is preinstalled on the armature shaft and only after this are they assembled and adjusted in relation to each other. In addition, the frictional engagement between the two brake discs is very susceptible to wear and other influences such as dirt, carbon dust, grease, and abrasion phenomena, which is why in EP 1 320 175 A2, the housing of the electric motor also has to be sealed in a watertight, airtight, and dust-tight fashion. In addition, there is the risk of the two brake elements tilting in relation to each other, as a result of which the stopping moment is not reliably transmitted and relatively loud noise can be generated.

DISCLOSURE OF THE INVENTION

Advantages of the Invention

The transmission/drive unit according to the present invention and the locking device situated therein as well as the method for manufacturing such a transmission/drive unit have the advantage that embodying the locking device as an independent, completely installable module significantly reduces the assembly cost for such a transmission/drive unit. In this case, it is not necessary for there to be a high degree of assembly precision of the drive element on the shaft in relation to the locking device and a high degree of positioning precision of the locking device in the housing of the transmission/drive unit. The axial tolerances (air gap) between the locking elements can be maintained at significantly less expense with the separate manufacture and independent function testing of the locking device. Due to the embodiment of an axial form-locked engagement between the two locking elements, the locking device is much less sensitive to dirt and grease, moisture, or carbon dust. The minimal wear and abrasion of the locked elements extends the longevity and long-term load capacity of the locking device. Due to the embodiment of the axial form-locked engagement between the two locking elements, for example in the form of an axial gearing (radially oriented flutes with teeth engaging in them), the locking device is also suitable for use in motor vehicles in which increased vibration- and agitation stresses occur. By contrast with the arrangement of brake discs, the present invention is not sensitive to a resonance frequency of the spring/mass system that is excited by the vibrations in the vehicle. The embodiment of an axial extension on the inner pole, which extends into corresponding openings in the axially movable locking element, prevents the two locking elements from tilting in relation to each other. Consequently this compact centering is able to achieve a reliable form-locked engagement in the locked position for the entire service life of the locking device.

Advantageous modifications of the device and method according to the independent claims are possible by means of the defining characteristics disclosed in the dependent claims. If the opening in the second locking disk is embodied in the form of a through opening, then the axial guidance can be implemented over the entire thickness and entire axial adjusting path of the second locking element.

In a particularly advantageous embodiment, the axial extension is embodied in the form of a centrally situated sleeve that radially supports the locking element uniformly over its entire circumference, thus making it possible to establish a definite basic play. As a result, the axial form-locked engagement between the two locking elements is oriented in an exactly concentric fashion, thus making it possible to absorb a higher locking moment.

If the extension is manufactured out of a material that is virtually nonconductive magnetically speaking, e.g. stainless steel, then this prevents the second locking element from being shifted radially by means of magnetic force. It is thus possible to prevent the locking element from resting against the lock housing, thus assuring a clean axial reciprocal engagement of the two locking elements over the long term.

Since the inner pole is produced from a material that is highly conductive magnetically, it is very favorable for the axial extension to be produced as a separately manufactured sleeve made of a different material and then to be introduced into a corresponding recess of the inner pole.

For higher long-term loads of the axial guidance of the locking element, the axial projection is provided with a coating that has particularly good sliding properties and is particularly wear-resistant. Preferably, nickel or a friction-reducing lacquer is used for this purpose.

In order to transmit the locking moment from the second locking element to the rotationally fixed electromagnet in the locked state, the electromagnet is provided with axial guide pins that engage in corresponding axial openings in the second locking element. The guide pins can therefore be manufactured in the form of injection-molded components that are integrally joined to the coil support. It is thus possible for the second locking element to be axially guided in a particularly simple fashion.

So that the axial form-locked engagement between the locking elements can be manufactured more easily and in a more reliable fashion, the guide pins are embodied as conical. There is thus a greater amount of play as the gear teeth find each other, as a result of which the teeth mesh with one another more deeply—and are thus able to transmit higher torques.

In an alternative embodiment, the radial extension has radial recesses that engage with corresponding counterpart recesses in the inner pole and/or in the second locking element. As a result, the locking moment can be transmitted directly from the second locking element to the transmission housing via the inner pole.

In a particularly suitable embodiment, the inner pole can have a bearing recess formed directly into it, into which the drive shaft, with a corresponding radial bearing, can be inserted.

If a damping element is embodied in the form of a ring encompassing the shaft, then the second locking element is damped uniformly over the entire circumference upon impact with the electromagnet. It is advantageously possible for the ring to be embodied of one piece and, due to its expansion, to be simply fastened over the entire circumference. Through the arrangement of a damping element between the electromagnet and the second locking element, it is possible to effectively suppress the excitation of structure-borne noise when the lock is released. In order to effectively suppress the structure-borne noise, in the best-case scenario, the damping element is embodied of a plastic, preferably an elastomer, which can effectively absorb the structure-borne noise over a large temperature range. For example, the electromagnet has an inner pole on which a coil element is supported, the two of which combine to form an axial end surface to which the damping element can be affixed.

In a preferred embodiment, an annular spring presses the annular damping element against the end surface of the electromagnet or second locking element. In this case, it is advantageous if the return spring, which is provided for the second locking element anyway, can be simultaneously used for the fixing of the damping element. If a conical spiral spring is used as the annular spring, then this assures a clean axial guidance of the second locking element without requiring additional space in the axial direction. In a particularly favorable embodiment, the spiral spring can rest against an axial offset between the inner pole and the coil element, thus fixing the spiral spring in the radial direction. If the inner pole forms such an axial offset with the coil element, then the damping element, embodied in the form of a hat-shaped cap, can advantageously be placed over the inner pole and the coil element so that the hat-shaped cap rests radially against the axial offset. Preferably, such a damping element is manufactured out of Teflon and optionally has an axial profile as a stop surface, which acoustically damps the stopping of the second locking element.

It is advantageous to operate the locking device in such a way that during the operating state, the at least one electromagnet is activated so that it pulls the second locking element axially away from the first locking element in opposition to a restoring force. As a result, the drive shaft is able to rotate unhindered during the powered state of the electromagnet. In the deactivated (unpowered) state of the electromagnet, the contact force of the return element then presses the second locking element against the first locking element in order to prevent rotary motion in the locked state. If the electromagnet pulls on the second locking element in the rotatable state, then this causes the locking element to rest against the damping element, which in turn rests against the electromagnet. This avoids a resonance generation due to acoustic vibrations.

The method according to the invention for manufacturing a transmission/drive unit according to the invention has the advantage that because the locking device is embodied separately, it can simply be inserted into the housing together with the two locking elements and mounted on the drive shaft without strict tolerance requirements. To that end, the drive shaft is inserted into a drive element that produces a form-locked engagement with the first locking element in order to transmit torque. In a particularly suitable embodiment, the locking device is installed in the housing of the drive unit by being press-fitted into place and then axially secured through material shaping. The axial positioning of the locking device here is not critical since the distance between the two locking elements is adjusted by means of the stops of the lock housing and drive shaft. In order to manufacture the separately installable locking device, it is particularly suitable to assemble the two locking elements with the electromagnet, the return element, and the damping element inside a lock housing, which can then in turn be simply installed into the housing of the transmission/drive unit. The lock housing in this case absorbs the forces acting on the locking device and transmits them to the housing of the transmission/drive unit. At the same time, if it is embodied, for example, as approximately closed, then the lock housing simultaneously protects the locking elements from dirt. The complete preassembly of the locking device with the two locking elements, the electromagnet, the at least one return element, and the damping element permits a supplier to independently produce this locking device, which is embodied in the form of a separate component, and test it for function and power consumption. This significantly simplifies the assembly and function testing of the transmission/drive unit.

DRAWINGS

Various exemplary embodiments of the locking device according to the invention and of a transmission/drive unit are shown in the drawings and explained in detail in the description that follows.

Figure 2:
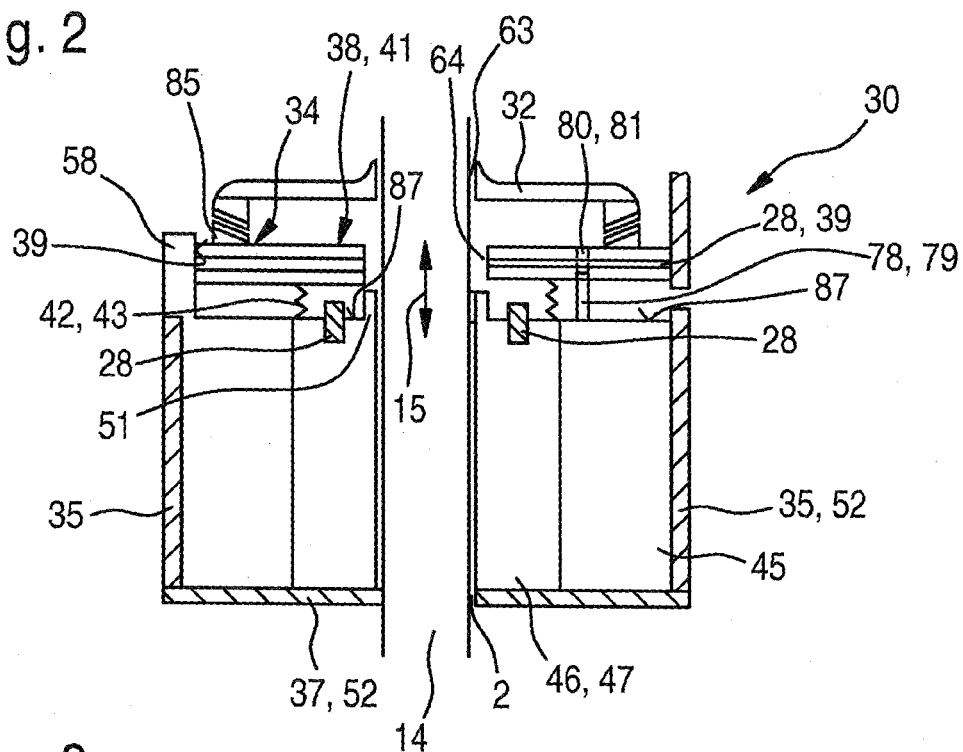
Figure 3:
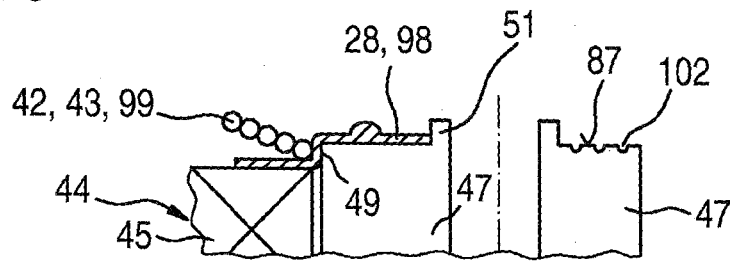
Figure 4:
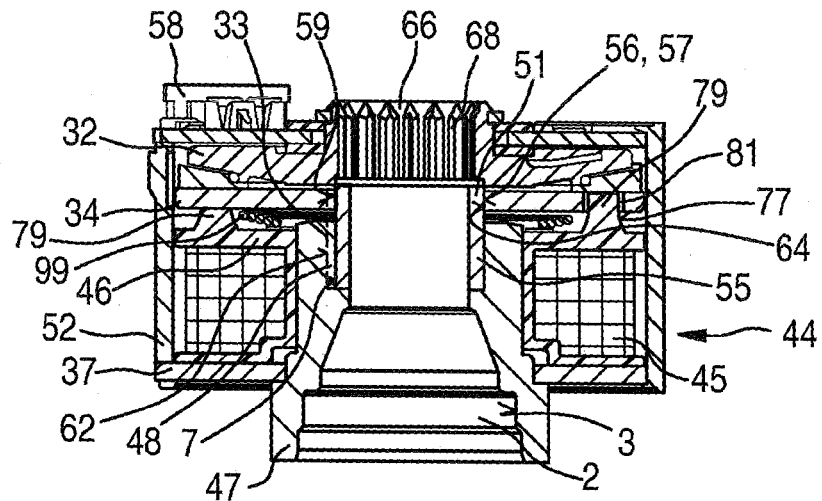
Figure 5:
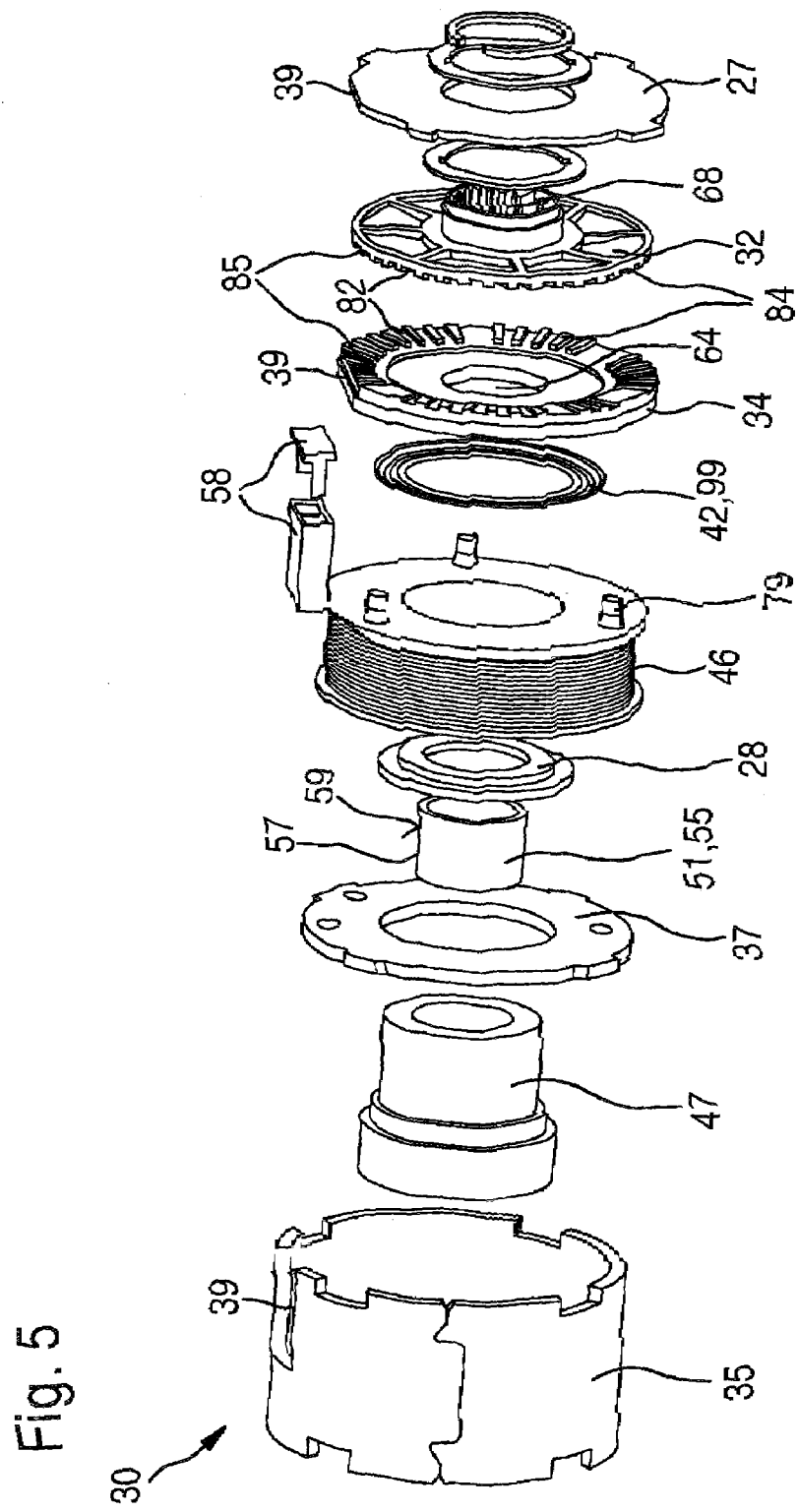

FIG. 1 shows a section through a locking device according to the invention, installed in a transmission/drive unit, FIG. 2 shows a section through another exemplary embodiment of a locking device, FIG. 3 shows an additional variation of a locking device according to FIG. 2, FIG. 4 shows a section through another locking device according to the invention, and FIG. 5 is an exploded depiction of the locking device from FIG. 4.

DESCRIPTION OF THE EXEMPLARY EMBODIMENTS

FIG. 1 shows a transmission drive unit 10 in which an electric motor 12 with a drive shaft 14 is situated inside a housing 16 of the transmission/drive unit 10. The drive shaft 14 is supported by means of a roller bearing 18 and/or a slide bearing 20 and has a worm 24 that cooperates, for example by means of a worm gear 22, with an actuating element, not shown, of a moving part in the motor vehicle. In order to lock the drive shaft 14 in relation to the housing 16, a locking device 30 composed of a first locking element 32 and second locking element 34 is situated inside the housing 16. The first locking element 32 engages in a radially form-locked fashion with a drive element 66 that is supported in a rotationally fixed fashion on the drive shaft 14. By contrast, the second locking element 34 is attached in a rotationally fixed fashion to the housing 16 of the transmission/drive unit 10. In the locked state (as shown in FIG. 1), the first locking element 32 engages in an axially form-locked fashion with the second locking element 34, thus preventing a rotation of the drive shaft 14. To this end, the two locking elements 32, 34 have radially extending flutes 82 and protrusions 84 that produce an axially form-locked engagement 85 and are pressed into engagement with one another in accordance with an axial gearing 85 by means of at least one resilient return element 42. In the exemplary embodiment, the surfaces of the locking elements 32, 34 that engage each other in a form-locked manner are situated at an angle of less than and greater than 90°, respectively, in relation to the shaft 14. The second locking element 34 is operatively connected to an electromagnet 44, which, in the powered state, pulls the second locking element 34 axially away from the first locking element 32 in opposition to the spring force of the return element 42 in such a way that the axial form-locked engagement 85 is released and the two locking elements 32 and 34 can rotate in relation to each other without touching each other. The electromagnet 44 has a coil support 46 that simultaneously constitutes part of the lock housing 52. On the one hand, the coil support 46 is attached to the housing 16 in a rotationally fixed fashion and on the other hand, it has axial guide elements 78 that cooperate with corresponding axial counterpart guide elements 80 of the second locking element 34.

This assures that when a current is applied to the electromagnet 44, the locking device 30 is in the rotatable state, whereas the unpowered state corresponds to the locked state. In this instance, the locking device 30 is a separate, preassembled component 31 that includes at least the two locking elements 32, 34 and the electromagnet 44. In FIG. 1, these components are situated in the lock housing 52 of the locking device 30; the lock housing 52 is inserted axially into the housing 16 and is prevented from shifting for example by means of a spring washer 53. Between the second locking element 34 and electromagnet 44, at least one damping element 28 is provided, which prevents the generation of objectionable noise when the second locking element 34 strikes against electromagnet 44. The first locking element 32 is embodied in the form of a disk with a central opening 63 that engages in a form-locked fashion with a drive element 66. The form-locked connection in the exemplary embodiment is composed of an internal gearing 68 of the first locking element 32 that is slid axially onto an external gearing 70 of the drive element 66. During assembly of the transmission/drive unit 10 here, the drive element 66 is first attached to the drive shaft 14 in a rotationally fixed fashion and then the drive shaft 14 with the drive element 66 is inserted axially through the locking device 30 into the opening 63. Inside the coil support 46, there is an inner pole 47 of the electromagnet 44, which has a central hole 2 to accommodate the shaft 14. To this end, the inner pole 47 has a bearing recess 3 in which the slide bearing 20 is situated. The inner pole 47 constitutes a magnetic yoke for the electromagnet 44 and has an axial extension 51 at one axial end that is embodied in the form of a sleeve 55 and extends into a central opening 64 embodied in the form of a through opening in the second locking element 34. An outer circumference surface 57 of the sleeve 55 constitutes a guide surface for the axial movement of the second locking element 34, thus centering the latter precisely in relation to the first locking element 32.

FIG. 2 shows another exemplary embodiment of a locking device 30. The coil support 46 of the electromagnet 44 is embodied in the form of an inner pole 47 on which the electric winding 45 is situated. The lock housing 52 has a cylindrical wall 35 that is attached, for example, to a separately embodied bottom surface 37 of the lock housing 52, in particular by being swaged onto it. The inner pole 47, together with the bottom surface 37 and the cylindrical wall 35, constitutes a magnetic yoke of the electromagnet 44 for the second locking element 34, which is embodied in the form of an armature plate 41. The second locking element 34 in this exemplary embodiment is composed of a structure-borne noise-damping composite plate 38. The axial form-locked engagement/gearing 85 in this case is formed onto the composite plate 38, for example is injection-molded out of plastic that is formed directly onto the plate. FIG. 2 shows a state in which the electromagnet 44 is powered and the locking element 34 has just disengaged from the form-locked engagement 82, 84, but has not yet come to rest against the damping ring 28 of the inner pole 47. The second locking element 34 is guided by the axial guides 78 formed onto the electromagnet 44 that are embodied in the form of guide pins 79 and engage in corresponding counterpart guide elements 80 embodied as axial holes 81 formed into the second locking element 34; for example, three holes 81 are provided. The return element 42, which is embodied in the form of an annular spring element 43 that encompasses the drive shaft 14, serves to reset the second locking element 34 in order to lock the transmission. In the locked state, the return element 42 presses the second locking element 34, which is embodied in the form of a disk, into a form-locked engagement with the first locking element 32. If the electromagnet 44 is supplied with current, then the magnetic force pulls the locking element 34 downward (in FIG. 2), as a result of which the form-locked engagement 85 of the locked state is released and the first locking element 32 is able to rotate frictionlessly in relation to the second locking element 34.

FIG. 3 shows another exemplary embodiment of a damping element 28 that is embodied in the form of a hat-shaped cap 98 that rests against the electromagnet 44. The inner pole 47 in this case cooperates with the electric winding 45 to form an axial offset 49 against which the hat-shaped cap 98 rests in the radial direction. Oriented toward the drive shaft 14, the inner pole 47 has an axial extension 51 toward which the hat-shaped cap 98 extends in the radial direction. The extension 51 also serves to axially guide and center the second locking element 34. An annular spring element 43 presses the cap 98 axially against the electromagnet 44; the spring element 43 is simultaneously embodied as the return element 42 of the second locking element 34. The spring element 43 is embodied as a conical spiral spring 99 that in particular rests against the cap 98 in the region of the axial offset 49. For improved contact of the hat-shaped damping element 98, the axial side 87 of the electromagnet 44 is provided with a structuring 102 (in particular flutes or bombardment) formed onto it, which should increase the action of the damping element 28.

FIG. 4 shows a locking device 30 in which the coil support 46 onto which the electric coil 45 is wound is situated on an annular inner pole 47. The lock housing 52, together with the bottom surface 37 and the inner pole 47, constitutes a yoke ring of the electromagnet 44 for the second locking element 34 embodied in the form of an armature disk 41. The inner pole 47 has a bearing recess 3, e.g. for a cup-and-ball bearing 20, of the shaft 14. The inner pole 47 is produced from a material with a good magnetic conductivity, for example with a high percentage of soft iron. On the axial side 87 oriented toward the second locking element 34, the inner pole 47 has an axial extension 51 that is embodied in the form of a sleeve 55 into which the shaft 14 can be introduced. The sleeve 55 is produced as a separate component from a material that has either no magnetic conductivity or only a negligible magnetic conductivity. The sleeve 55 is manufactured, for example, of a correspondingly non-magnetizable stainless steel and optionally has a coating 59. A friction-reducing lacquer or a nickel coating can be used as the coating 59. The axial extension 51 extends into the central opening 64 of the second locking element 34 in order to center it. The axial opening 64 is embodied in the form of a through opening that the axial extension 51 passes through over the entire thickness 4 of the second locking element 34, regardless of whether the lock is open or closed. In this connection, the outer circumference surface 57 of the sleeve 55 constitutes a guide surface 56 for the axial movement of the second locking element 34. In order to optimize the sliding and wear properties, the coating 59 is preferably applied to at least this axial guide surface 56. The second locking element 34 can then be supported radially on the sleeve 55 with a definite basic play over a long service life and in the presence of large temperature fluctuations. In exemplary embodiment, the sleeve 55 is embodied as circular on the circumference surface 57 and is press-fitted into a corresponding recess 7 of the inner pole 47. In order to transmit the locking moment in the closed state of the lock, the axial side 87 of the electromagnet 44 is provided with the guide pins 79 that engage in corresponding holes 81 in the second locking element 34. These guide pins 79 are conically embodied in FIG. 4 so as to facilitate the ability of the gear teeth of the two locking elements 32, 34 to find each other as the lock is being closed. In this case, the cone angle 77 in relation to the axial direction 14 is determined by the gearing angle of the axial form-locked engagement 85 and the magnetic pulling force. The guide pins 79 injection-molded out of plastic are integrally joined to the coil support 46 and taper in the axial direction 15 toward the second locking element 34. For example, three guide pins 79 are injection-molded into place and are situated on the electromagnet 44 in a rotationally symmetrical arrangement. The electromagnet 44 in turn is fastened in a rotationally fixed fashion in the housing 16 of the transmission/drive unit 10 so that the locking moment is transmitted to the housing 16 that is in turn connected to the chassis.

In one variation, the circumference surface 57 of the sleeve 55 has radial recesses 62 formed into it, which produce a form-locked engagement with an inner profile 48 of the inner pole 47 in order to connect the sleeve 55 to the inner pole 47 in a rotationally fixed fashion. At the same time, the radial recesses 62 engage in corresponding radial recesses 33 of the second locking element 34 so that the locking moment is transmitted from the second locking element 34 to the transmission housing 16 via the sleeve 55, the inner pole 47, and the lock housing 52.

FIG. 5 is an exploded depiction of the separately preassemblable component 31 of the locking device 30 from FIG. 4. All of the components are mounted in the axial direction 15. The cylinder wall 35, together with the bottom surface 37, the inner pole 47, and a cover 27, constitutes the lock housing 52 into which the coil support 46 with the electric winding 45 is inserted in a rotationally fixed fashion. The sleeve 55 with the coating 59, functioning as an axial extension 51, is inserted axially into the inner pole 47. On the axial side 87 of the electromagnet 44, the damping element 28 that extends radially to the sleeve 55 is situated against the inner pole 47 and the coil support 46. On the damping element 28, the annular return spring 42 rests against the axially movable second locking element 34 into which both the sleeve 55 and the conical guide pins 79 extend in the axial direction. The second locking element 34, together with the first locking element 32 that functions as an axial form-locked engagement 85, produces a flat gearing 85 via which the locking moment is transmitted. The first locking element 32 is supported in rotatable fashion in the cover 27; the shaft 14 with its drive element 66 is able to engage in the internal gearing 68 of the first locking element 32. For supplying electrical power to the electromagnet 44, a plug element 58 is provided on the coil support 46, for which corresponding recesses 39 are formed into the lock housing 52 and second locking element 34.

It should be noted with regard to the exemplary embodiments shown in the figures and disclosed in the description that there are a multitude of possible combinations of the individual defining characteristics. It is thus possible, for example, to vary the concrete embodiment of the form-locked engagement 85 between the first and second locking elements 32, 34 and the concrete embodiment of the damping element 28 and spring element 43 and to adapt them to the requirements, in particular with regard to vibration-, agitation-, and noise loads. Preferably, the transmission/drive unit 10 according to the invention is used to actuate a differential transmission of a vehicle that is subjected, for example, to an agitation load of 20 g. The locking device 30 according to the invention can, however, also be used for other electric motors 12 such as actuator drive units, which are subjected to a high temperature- and vibration load.

What is claimed is:

1. A locking device (30) for preventing a rotating motion of a shaft (14) in relation to a housing (16) of a transmission/drive unit (10), having a first locking element (32) and a second locking element (34) that an electromagnet (44) and at least one return element (42) are able to move axially in relation to the first locking element (32) in order to produce a rotationally fixed connection between the first and second locking elements (32, 34), wherein the electromagnet (44) has an inner pole (47) that is encompassed by an electric coil (45), which inner pole (47) has an axial extension (51) that extends into a corresponding opening (64) of the second locking element (34) in order to produce an axial guidance and centering, and wherein the second locking element (34) has axial holes (81) into which axial guide pins (79), formed onto an axial side (87) of the electromagnet (44), extend, the guide pins taper in an axial direction (15) towards the second locking element (34) in order to axially guide the second locking element (34), and the guide pins (79) are conically embodied at a cone angle (77) determined so that there is enough play for gear teeth of an axial form-locked engagement (85) of the two locking elements (32, 34) to find each other during the closing process of the locking device.

2. The locking device (30) as recited in claim 1, wherein the second locking element (34) is embodied in the form of a disk that includes the opening (64) in a form of a central passage (64) with a thickness (4).

3. The locking device (30) as recited in claim 1, wherein the axial extension (51) is embodied in the form of a sleeve (55) that encompasses an insertable drive shaft (14) and the second locking element (34) rests against the sleeve (55) in the radial direction.

4. The locking device (30) as recited in claim 1, wherein the axial extension (51) extends of the entire axial thickness (4) of the opening (64) in both the closed and open state of the lock.

5. The locking device (30) as recited in claim 1, wherein the inner pole (47) is produced out of a magnetically conductive material to constitute a magnetic yoke of the electromagnet (44) and the axial extension (51) is produced out of a material with virtually no magnetic conductivity or poor magnetic conductivity in order to prevent a magnetic short-circuit between the extension (51) and the second locking element (34).

6. The locking device (30) as recited in claim 5, wherein the magnetically conductive material comprises soft iron.

7. The locking device (30) as recited in claim 5, wherein the material with virtually no magnetic conductivity or poor magnetic conductivity comprises stainless steel.

8. The locking device (30) as recited in claim 1, wherein the axial extension (51) is produced as a separate component that is press-fitted into a recess of the inner pole (47).

9. The locking device (30) as recited in claim 1, wherein the axial extension (51) has an external profile that engages in a corresponding internal profile (48) of the inner pole (47) and/or in corresponding radial recesses (33) in the opening (64).

10. The locking device (30) as recited in claim 1, wherein at least the outer surface (57) of the axial extension (51) has a coating (59) that is in particular embodied in the form of a friction-reducing lacquer or nickel layer.

11. The locking device (30) as recited in claim 1, wherein the inner pole (47) has a bearing recess (3) formed into it for mounting a pivot bearing (20) of the drive shaft (14).

12. The locking device (30) as recited in claim 11, wherein the pivot bearing (20) comprises a cup and ball bearing.

13. The locking device (30) as recited in claim 1, wherein the locking device (10) is embodied as an independent, pre-assembled component (31); in the locked state, the locking elements (32, 34) engage in each other in the axial direction (15) by means of a form-locked engagement (85) and wherein the second locking element (34) is embodied in the form of an armature plate (41) that constitutes a magnetic yoke for the electromagnet (44).

14. The locking device (30) as recited in claim 1, wherein the axial guide pins (79) are formed onto a coil support (46) of the electromagnet (44) by means of a plastic injection-molding process.

15. The locking device (30) as recited in claim 1, wherein between the second locking element (34) and the electromagnet (44), there is a damping element (28) against which a return element (42) rests, which return element is embodied in the form of a conical spiral spring (43); the damping element (28) is in particular embodied in the form of a hat-shaped cap (98).

16. A transmission/drive unit (10) equipped with a locking device (10) as recited in claim 1, wherein the locking device (30) is situated on the drive shaft (14) by means of a pivot bearing (20), which shaft is embodied as the armature shaft (14) of an electric motor (12), and a worm (24) is situated on the drive shaft (14) and meshes with a worm gear (22).

17. A method for manufacturing a transmission/drive unit (10) as recited in claim 1, comprising steps of:
   testing a function of the locking device (30) as a separate component (31) enclosed by a lock housing (52);
   attaching the locking device (30) in the housing (16) of the transmission/drive unit (10); and
   inserting the shaft (14) with a drive element (66) in a form-locked engagement (68, 70) into a central recess (63) of the first locking element (32).

18. The locking device (30) as recited in claim 1, wherein the axial guide pins (79) are formed as three guide pins (79), which are situated so that they are distributed uniformly over the circumference of the electromagnet (44).

* * * * *